(12) United States Patent
Sakurai et al.

(10) Patent No.: US 7,387,651 B2
(45) Date of Patent: Jun. 17, 2008

(54) FUEL REFORMING DEVICE AND FUEL REFORMING METHOD

(75) Inventors: Kazuhiro Sakurai, Gotemba (JP); Kazuhiro Wakao, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 645 days.

(21) Appl. No.: 10/954,282

(22) Filed: Oct. 1, 2004

(65) Prior Publication Data

US 2005/0087437 A1 Apr. 28, 2005

(30) Foreign Application Priority Data

Oct. 27, 2003 (JP) .............................. 2003-366578

(51) Int. Cl.
*C01B 3/24* (2006.01)
*B01J 8/00* (2006.01)
*C10L 3/00* (2006.01)

(52) U.S. Cl. ................... 48/127.7; 48/127.9; 48/198.3; 48/198.8; 422/211; 422/222

(58) Field of Classification Search ............... 48/127.7, 48/127.9, 198.3, 198.8; 422/198, 199, 211, 422/222, 108
See application file for complete search history.

(56) References Cited

U.S. PATENT DOCUMENTS 6,620,389 B1 * 9/2003 Lesieur ....................... 422/220
6,929,785 B2 * 8/2005 Grieve et al. ................ 422/199
6,997,142 B2 * 2/2006 Wakao et al. .................. 123/3
7,150,769 B2 * 12/2006 Sakurai et al. ............. 48/198.7
7,157,170 B2 * 1/2007 Kushibiki et al. ............ 429/26
7,159,541 B2 * 1/2007 Wakao et al. .................. 123/3
7,160,342 B2 * 1/2007 Grieve et al. .............. 48/198.1
7,174,861 B2 * 2/2007 Allston et al. .............. 123/1 A
7,244,281 B2 * 7/2007 Crane et al. ................. 48/128

FOREIGN PATENT DOCUMENTS

JP          A 2001-227419          8/2001

\* cited by examiner

*Primary Examiner*—N. Bhat
(74) *Attorney, Agent, or Firm*—Oliff & Berridge, PLC

(57) ABSTRACT

A fuel reforming device for reforming an air-fuel mixture includes a mixing chamber to which fuel and air are introduced and which is composed such that an air-fuel mixture flows upward; a reforming reaction chamber which is arranged downstream of the mixing chamber and which includes a reforming catalyst that reforms the air-fuel mixture; an inclined surface for recovering the fuel which has not reached the inside of the reforming reaction chamber; and a fuel recovery pipe and a fuel recovery pump which are used for re-introducing unvaporized fuel and the like collected by the inclined surface to the mixing chamber.

20 Claims, 10 Drawing Sheets

FUEL REFORMING DEVICE AND FUEL REFORMING METHOD

INCORPORATION BY REFERENCE

The disclosure of Japanese Patent Application No. 2003-366578 filed on Oct. 27, 2003 including the specification, drawings and abstract is incorporated herein by reference in its entirety.

BACKGROUND OF THE INVENTION

1. Field of the Invention

The invention relates to a fuel reforming device and fuel reforming method for reforming a mixture of fuel and air (hereinafter, referred to as an "air-fuel mixture).

2. Description of the Related Art

Generally, a fuel reforming device for reforming an air-fuel mixture includes a reforming catalyst which reforms the air-fuel mixture, and a mixing chamber which is arranged upstream from the reforming catalyst and to which fuel and air are supplied. There is a known fuel reforming device that includes a plurality of heat exchanger plates, which is provided such that an air-fuel mixture meanders up and down, in a mixing chamber arranged at the side of a reforming catalyst, for example, as disclosed in Japanese Patent Laid-Open Publication No. 2001-227419 (JP-A-2001-227419). With this fuel reforming device, particles of fuel which has not been vaporized (i.e., atomized) sufficiently (i.e., unvaporized fuel), each of the particles still having a relatively heavy weight, cannot reach the reforming catalyst. Also, it is estimated that liquid fuel condensed on a wall surface of the mixing chamber is blocked by the heat exchanger plates, and the fuel is inhibited from reaching the reforming catalyst. In this case, it can be considered that the unreformed fuel is not discharged from the fuel reforming device, and remains in the mixing chamber.

In addition, the mixing chamber is partitioned into multiple spaces by the heat exchanger plates. Accordingly, it is difficult to recover the unreformed fuel remaining in the mixing chamber.

SUMMARY OF THE INVENTION

It is an object of the invention to provide a fuel reforming device and fuel reforming method, which appropriately inhibits unvaporized fuel and the like from flowing into a reforming catalyst, and which can efficiently recover the unvaporized fuel and the like.

A first aspect of the invention relates to a fuel reforming device for reforming an air-fuel mixture. The fuel reforming device includes a mixing chamber to which fuel and air are introduced and which is composed such that an air-fuel mixture flows upward; a reforming reaction chamber which is arranged downstream of the mixing chamber and which includes a reforming catalyst for reforming the air-fuel mixture; and a fuel recovering portion which is arranged in a lower portion of the mixing chamber and which recovers fuel that has not reached the inside of the reforming reaction chamber.

This fuel reforming device includes the mixing chamber to which fuel and air are introduced and which is composed such that an air-fuel mixture flows upward; and the reforming reaction chamber which is arranged downstream of the mixing chamber and which includes the reforming catalyst for reforming the air-fuel mixture. The air-fuel mixture flows upward in the mixing chamber, and flows into the reforming reaction chamber arranged downstream of the mixing chamber. Thus, with this fuel reforming device, it is possible to easily and reliably inhibit, using gravity, particles of fuel which has not been sufficiently vaporized (i.e., atomized), each of the particles still having a relatively heavy weight, and liquid fuel, which is condensed on a wall surface of the mixing chamber, from flowing into the reforming reaction chamber arranged downstream of the mixing chamber. Then, the unvaporized fuel and the like, which have not reached the inside of the reforming reaction chamber, flow downward to the lower portion of the mixing chamber, and are recovered by the fuel recovering portion arranged in the lower portion of the mixing chamber. As a result, with this fuel reforming device, it is possible to appropriately inhibit the unvaporized fuel and the like from flowing into the reforming catalyst, and efficiently recover the unvaporized fuel and the like.

A second aspect of the invention relates to a fuel reforming method for reforming an air-fuel mixture. In this method, fuel and air are introduced to a predetermined mixing chamber, and an air-fuel mixture is made to flow upward and flow into a reforming reaction chamber arranged downstream of the mixing chamber. Meanwhile, the fuel which has not reached the inside of the reforming reaction chamber is recovered at a lower portion of the mixing chamber.

A third aspect of the invention relates to a fuel reforming device for reforming an air-fuel mixture. The fuel reforming device includes a mixing chamber to which fuel and air are introduced and which is composed such that an air-fuel mixture flows upward; a reforming reaction chamber which is arranged downstream of the mixing chamber and which includes a reforming catalyst for reforming the air-fuel mixture; and fuel recovering means arranged in a lower portion of the mixing chamber, for recovering fuel that has not reached the inside of the reforming reaction chamber.

According to the first to third aspects of the invention, it is possible to realize the fuel reforming device and fuel reforming method which appropriately inhibits the unvaporized fuel and the like from flowing into the reforming catalyst, and which can efficiently recover the unvaporized fuel and the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereafter, a preferred embodiment of the invention will be described in detail with reference to accompanying drawings.

Figure 1:
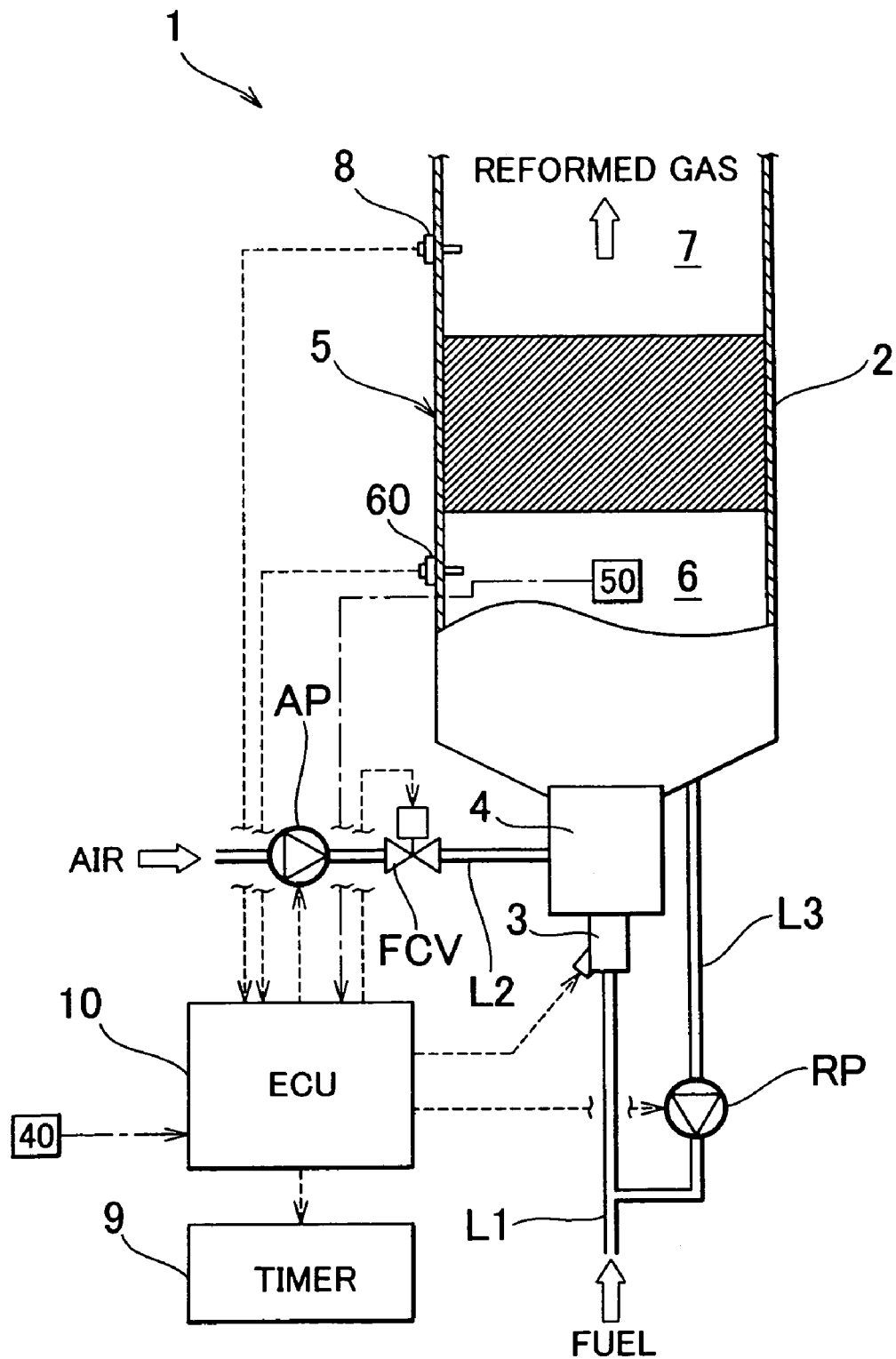
FIG. 1 is a view schematically showing a fuel reforming device according to a first embodiment of the invention.

Hereafter, a first embodiment of the invention will be described. FIG. 1 is a view schematically showing a fuel reforming device according to the first embodiment of the invention. A fuel reforming device 1 shown in FIG. 1 can reform a mixture formed of for example, hydrocarbon fuel such as gasoline and air. The fuel reforming device 1 is used for, for example, producing fuel (i.e., reformed gas) for an internal combustion engine that is a drive source of an automobile. As shown in FIG. 1, the fuel reforming device 1 includes a substantially cylindrical main body 2, and is used while the axis of the main body 2 extends substantially vertically. The fuel reforming device 1 further includes a fuel injection valve (i.e., fuel supply means) 3 which is connected to one end portion (a lower portion in FIG. 1) of the main body 2. The fuel injection valve 3 is connected to a fuel tank (not shown) via a fuel supply pipe L1 and a fuel pump (not shown). The fuel injection valve 3 injects hydrocarbon fuel such as gasoline upward when the fuel reforming device 1 is being used.

Figure 2:
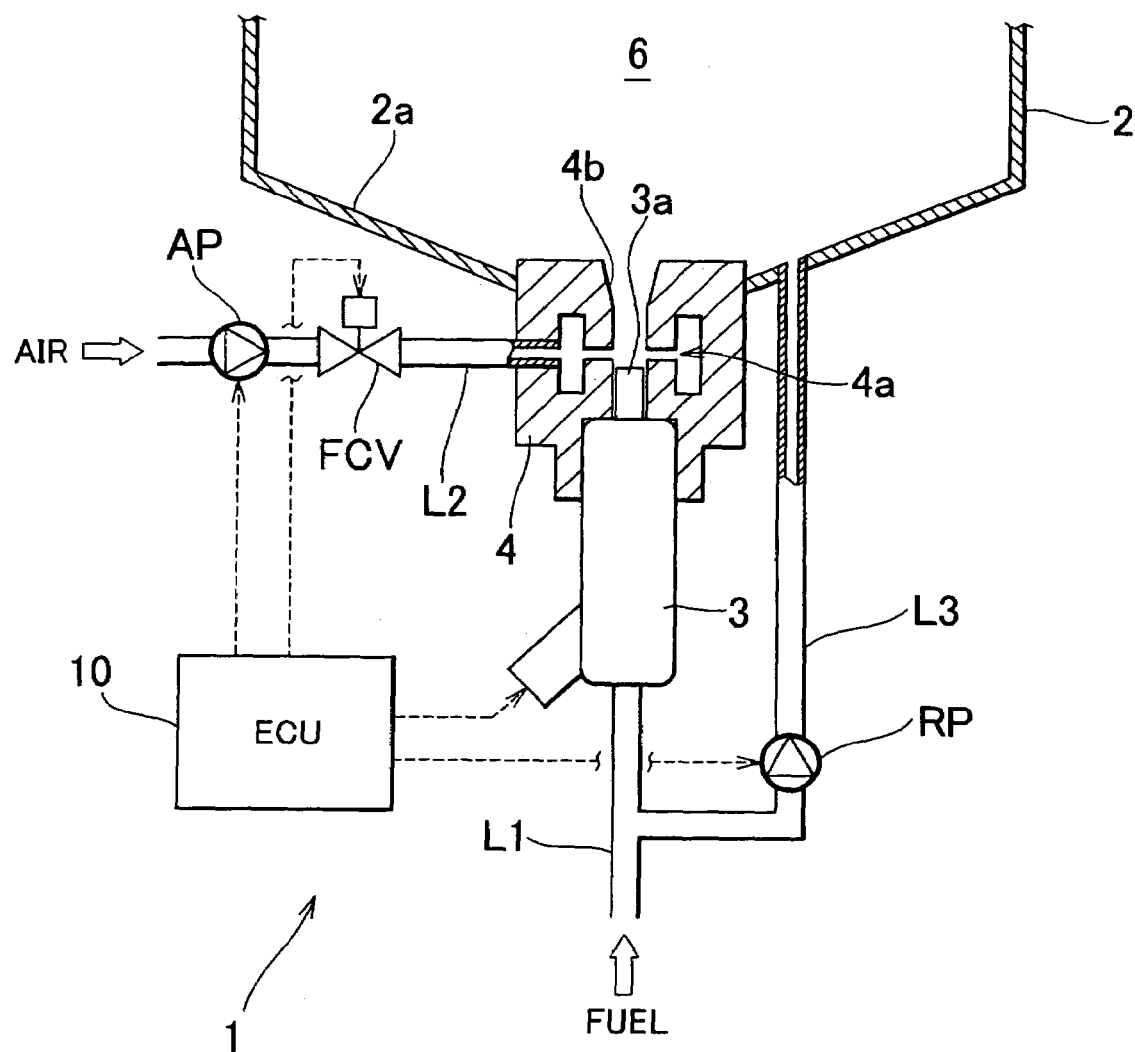
FIG. 2 is a sectional view showing an enlarged main portion of the fuel reforming device in FIG. 1.

As shown in FIG. 1 and FIG. 2, an end portion of the fuel injection valve 3 is housed in a value housing portion 4 connected to the main body 2. An end of an intake pipe L2 provided with an air pump AP and a flow control valve FCV is connected to the valve housing portion 4. Inside the valve housing portion 4, an air passage 4a is arranged so as to be communicated to the intake pipe L2 and surround a nozzle 3a of the fuel injection valve 3. Further, in the valve housing portion 4, there is formed an air-fuel mixture spray hole 4b, which is communicated to the air passage 4a, is positioned above the nozzle 3a, and extends substantially vertically when the fuel reforming device 1 is being used. Thus, when the air pump AP is operated and the flow control valve FCV is opened, air is blown to the nozzle 3a (fuel injection hole) of the fuel injection valve 3 from the side. Accordingly, when the fuel injection valve 3 is opened and fuel is injected in this state, an air-fuel mixture is injected from the air-fuel mixture spray hole 4b of the valve housing portion 4.

Inside the main body 2, there is arranged a reforming reaction chamber 5 including a predetermined reforming catalyst at a predetermined distance from the valve housing portion 4, and there is arranged a mixing chamber 6, which is communicated to the air-fuel mixture spray hole 4b, between the valve housing portion 4 and the reforming reaction chamber 5. Namely, when the fuel reforming device 1 is being used, the reforming reaction chamber 5 is positioned above the mixing chamber 6. In the embodiment, the reforming reaction chamber 5 is constituted by providing a honeycomb body supporting a predetermined reforming catalyst inside the main body 2. As the reforming catalyst, for example, a reforming catalyst in which zirconia supports rhodium can be employed. In addition, in the main body 2, a reformed gas supply chamber 7 is arranged downstream of the reforming reaction chamber 5. The reformed gas supply chamber 7 is connected to a reformed gas supply pipe (not shown) for supplying reformed gas to elements to be supplied with reformed gas, such as the internal combustion engine.

In order to start a reforming reaction in the reforming reaction chamber 5, it is necessary to set a temperature of the reforming reaction chamber 5 (reforming catalyst) to a predetermined temperature (approximately 400° C., for example) or higher, in addition to appropriately supplying an air-fuel mixture. Therefore, it is preferable to preheat the reforming catalyst before starting the reforming reaction, by employing a method of using a known device for electrically heating the catalyst (not shown) (i.e., a method of heating a honeycomb body by supplying electric power to the metal honeycomb, that is, a carrier of the reforming catalyst which is formed of a metal membrane), a burner heating method (i.e., a method of providing a burner upstream from the reforming catalyst and heating the reforming catalyst using heat generated by the burner), or the like. When the reforming reaction is once started, the reforming reaction is continued by the heat generated due to the reforming reaction. Accordingly, electric power supply to the honeycomb body and heating by the burner may be stopped.

As shown in FIG. 2, a lower end portion (a bottom portion) of the main body 2 is formed so as to include an inclined surface 2a around the valve housing portion 4 (fuel injection valve 3) which injects an air-fuel mixture upward. The inclined surface 2a is inclined downward toward the valve housing portion 4 (fuel injection valve 3). Also, one end of a fuel recovery pipe L3 provided with a fuel recovery pump RP is connected to a portion near a lowermost portion of the inclined surface 2a of the main body 2 (mixing chamber 6). The other end of the fuel recovery pipe L3 joins the fuel supply pipe L1 for supplying fuel to the fuel injection valve 3.

As shown in FIG. 1 and FIG. 2, the fuel reforming device 1 includes an electronic control unit (hereinafter, referred as an "ECU") which serves as control means of the fuel reforming device 1. The ECU 10 includes a CPU, ROM, RAM, an input/output port, a storing device and the like (none of these is shown). The fuel injection valve 3, the air pump AP, the flow control valve FCV, the fuel recovery pump RP, and the like are connected to the input/output port of the ECU 10. The main body 2 is provided with a temperature sensor 8 which detects a temperature of reformed gas in the reformed gas supply chamber 7 (i.e., a catalyst bed temperature of the reforming reaction chamber 5). The temperature sensor 8, as well as a temperature sensor 40 which detects an atmospheric temperature outside the fuel reforming device 1 and other sensors (not shown), is also connected to the input/output port of the ECU 10. A timer 9, which starts measuring time when being activated by the ECU 10, is further connected to the input/output port of the ECU 10. The ECU 10 controls the fuel injection valve 3, the air pump AP, the flow control valve FCV, the fuel recovery pump RP and the like based on values obtained by the temperature sensor 8, the timer 9, and the like, and according to various control programs, maps and the like.

When an air-fuel mixture is reformed using the thus composed fuel reforming device 1, the ECU 10 of the fuel reforming device 1 controls at least one of the fuel injection valve 3, the air pump AP and the flow control valve FCV such that an air-fuel ratio of an air-fuel mixture to be supplied to the reforming reaction chamber 5 becomes an intended value (a substantially constant value in the embodiment). For example, a ratio O/C of oxygen atoms in the air to carbon atoms in the fuel to be supplied to the mixing chamber 6 is set to a value in the range approximately from "0.8" to "1.05"). Then, air is blown, from the side, to the nozzle 3a (the fuel splay hole) of the fuel injection valve 3 which injects fuel, and an air-fuel mixture is sprayed from the air-fuel mixture spray hole 4b of the valve housing portion 4.

The air-fuel mixture sprayed from the air-fuel mixture spray hole 4b of the valve housing portion 4 flows upward in the mixing chamber 6 and flows into the reforming reaction chamber 5 arranged downstream of the mixing chamber 6. In the fuel reforming chamber 5, a reaction of hydrocarbon fuel and air is caused by the reforming catalyst, and reformed gas containing CO and $H_2$ is generated when a partial oxidation reaction shown by the following equation (1) develops. The obtained reformed gas flows from the reforming reaction chamber 5 to the reformed gas supply chamber 7, and is supplied from the reformed gas supply chamber 7 to the elements to be supplied with reformed gas, such as the internal combustion engine.

$$C_mH_n+(m/2)O_2 \rightarrow mCO+(n/2)H_2 \qquad (1)$$

Meanwhile, the fuel sprayed from the air-fuel mixture spray hole 4b to the mixing chamber 6 contains particles of fuel which has not been vaporized (i.e., atomized) sufficiently (i.e., unvaporized fuel), each of the particles still having a relatively heavy weight, and liquid fuel condensed on the wall surface of the mixing chamber. In this case, in the fuel reforming device 1, the air-fuel mixture flows upward in the mixing chamber 6 and flows in the reforming reaction chamber 5 arranged downstream of the mixing chamber 6, as mentioned above. Therefore, particles of the unvaporized fuel each of which has a relatively heavy weight and particles of the liquid fuel are prevented from flowing in the reforming reaction chamber 5 by gravity, and flows downward to the lower portion of the mixing chamber 6.

The unvaporized fuel and the like drop on the inclined surface 2a and move along the inclined surface 2a so as to be collected around the valve housing portion 4. Namely, the inclined surface 2a formed in the lower portion of the mixing chamber 6 serves as fuel recovering means for recovering the fuel which has not reached the inside of the reforming reaction chamber 5. It is thus possible to easily and reliably recover the fuel which has not reached the inside of the reforming reaction chamber 5 without using dedicated power for recovering the fuel. When the fuel recovery pump RP is activated by the ECU 10 at predetermined time, the fuel recovered in the lower portion of the mixing chamber 6 is sucked by the fuel recovery pump RP via the fuel recovery pipe L3, returned from the inside of the main body 2 to the fuel supply pipe L1, and mixed with the fuel pumped from the fuel tank by the fuel pump. It is thus possible to re-supply the fuel recovered by the inclined surface 2a serving as the fuel recovery means to the mixing chamber 6.

As described above, with the fuel reforming device 1, it is possible to easily and reliably inhibit, using gravity, particles of fuel which has not been sufficiently vaporized (i.e., atomized), each of the particles still having a relatively heavy weight, and liquid fuel, which is condensed on the wall surface of the mixing chamber 6, from flowing into the reforming reaction chamber 5. Then, the unvaporized fuel and the like, which have not reached the inside of the reforming reaction chamber 5, flow downward to the lower portion of the mixing chamber 6, and are recovered by the inclined surface 2a serving as the fuel recovering means arranged in the lower portion of the mixing chamber 6. As a result, with the fuel reforming device 1, it is possible to appropriately inhibit the unvaporized fuel and the like from flowing into the reforming reaction chamber 5, and efficiently recover the unvaporized fuel and the like.

The amount of the unvaporized fuel and the like is large when an inside temperature of the mixing chamber 6 and the like are relatively low, for example, when reforming is started. The amount of the unvaporized fuel and the like then decreases as the inside temperature of the mixing chamber 6 and a temperature of the wall portion of the mixing chamber 6 (the main body 2) increase. Therefore, the amount of the fuel, which does not flow into the reforming reaction chamber 5 and which is recovered in the mixing chamber 6, changes according to time that has elapsed since the reforming is started (hereinafter, referred to as "elapsed time since the start of reforming"). If the amount of the unvaporized fuel and the like changes, the air-fuel ratio between fuel and air in the reforming reaction chamber 5, where the reforming reaction actually proceeds, also changes.

Figure 3:
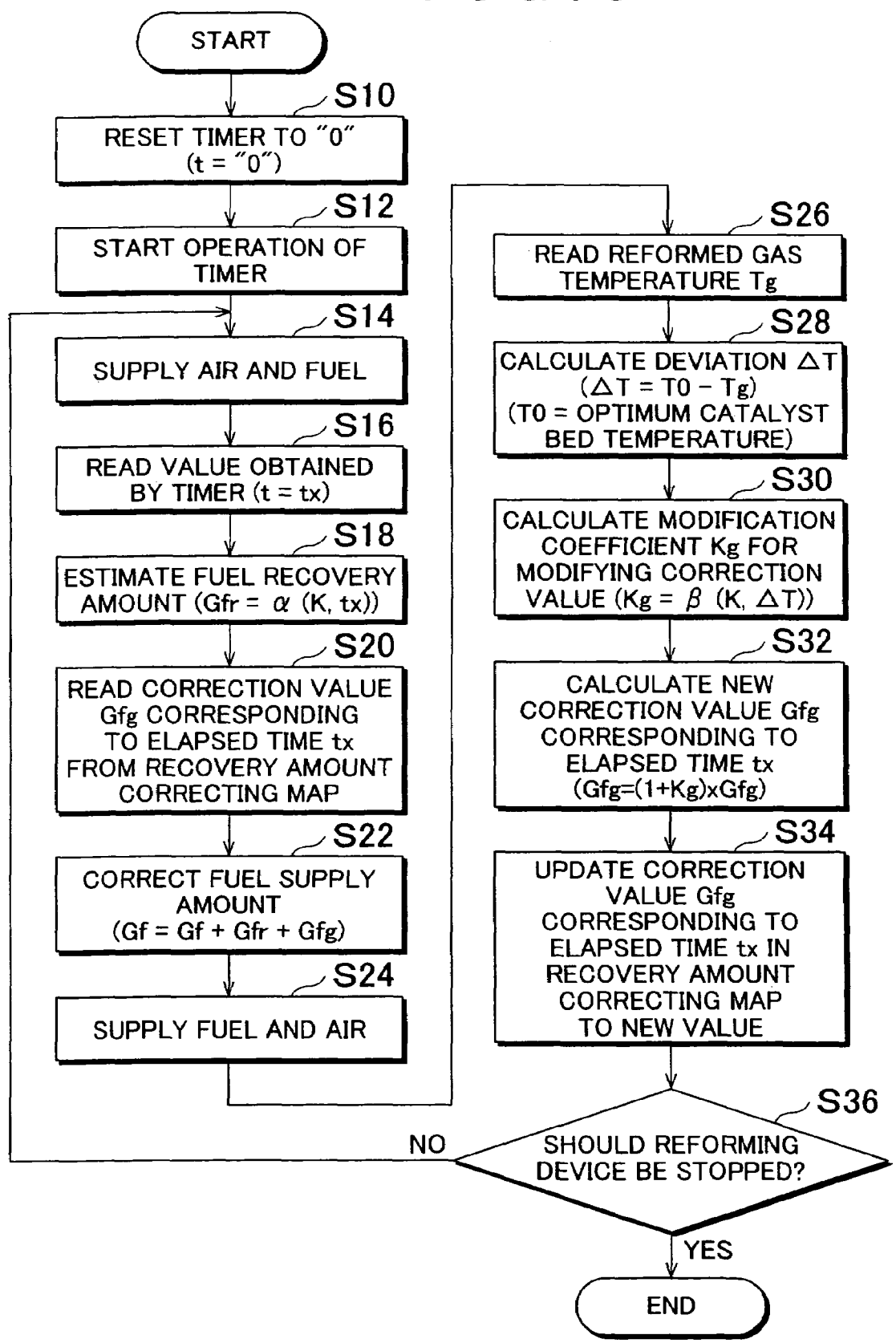
FIG. 3 is a flowchart for describing a control routine of the fuel reforming device shown in FIG. 1 and FIG. 2.

Based on the above-mentioned facts, the ECU 10 of the fuel reforming device 1 controls the fuel injection valve 3, the air pump AP and the flow control valve FCV while accurately ascertaining the amount of fuel recovered in the mixing chamber 6, according to the routine shown in FIG. 3, in order to accurately set the air-fuel ratio in the reforming reaction chamber 5, where the reforming reaction actually proceeds, to an intended value.

The control routine for the fuel reforming device 1, shown in FIG. 3, will be described in detail. When the fuel reforming device 1 is started, the ECU 10 resets the timer 9 to "0" in step S10, and starts the operation of the timer 9 in step S12. Thus, the timer 9 starts measurement of an elapsed time tx since the start of reforming, and transmits a signal showing the elapsed time tx to the ECU 10. Substantially simultaneously with starting the operation of the timer 9, the ECU 10 sets an amount of fuel to be injected (hereinafter, referred to as a "fuel injection amount") Gf from the fuel injection valve 3 and an amount of air to be supplied (hereinafter, referred to as an "air supply amount") Ga to the valve housing portion 4 (mixing chamber 6) based on a signal from the temperature sensor 8 and according to a predetermined map and the like, and the ECU 10 transmits predetermined control signals to the fuel injection valve 3, the air pump AP and the flow control valve FCV. Thus, fuel is injected from the fuel injection valve 3 and air is supplied to the valve housing portion 4 in step S14.

After performing step S14, the ECU 10 reads the elapsed time tx since the start of reforming based on the signal from the timer 9 in step S16. The ECU 10 then calculates (estimates) an amount Gfr of the recovered (hereinafter, referred to as a "recovery amount") unvaporized fuel and liquid fuel in the mixing chamber 6 using a function α (K, tx) of the elapsed time tx and a predetermined coefficient K in step S18. The function α (K, tx) is set in advance based on the relationship between the elapsed time tx since the start of reforming, and the inside temperature of the mixing chamber 6 and the temperature of the wall portion, and according to experimental data and the like. The function α (K, tx) is stored in the storing device of the ECU 10. Note that, in step S18, a map which defines the relationship between the elapsed time tx since the start of reforming and the recovery amount of the unvaporized fuel and the like may be used instead of the function α (K, tx), in order to calculate the fuel recovery amount Gfr.

Then, in step S20, the ECU 10 reads a correction vale Gfg corresponding to the elapsed time tx from a recovery amount correcting map for correcting the recovery amount Gfr of the unvaporized fuel and the like, which is calculated (estimated) in step S18. The recovery amount correcting map used in this case is set in advance based on experimental data and the like, and stored in the storing device of the ECU 10. In step S22, the ECU 10 corrects the amount Gf of the fuel to be injected from the fuel injection valve 3, using the fuel recovery amount Gfr obtained in step S18 and the correction value Gfg obtained in step S20. Namely, the ECU 10 sets a new fuel injection amount Gf (Gf=Gf+Gfr+Gfg) in step S22, and transmits a predetermined control signal to at least the flow control valve FCV (also to the fuel injection valve 3 and the air pump AP, if necessary) in step S24.

After performing step S24, the ECU 10 reads a temperature Tg of the reformed gas in the reformed gas supply chamber 7 (catalyst bed temperature) based on the signal from the temperature sensor 8 in step S26. The ECU 10 then calculates a deviation ΔT between an optimum catalyst bed temperature T0, which is set in advance based on a reforming efficiency (fuel conversion rate) in the reforming reaction chamber 5, and the reformed gas temperature (catalyst bed temperature) Tg obtained in step S26 (T=T0−Tg), in step S28.

The reforming efficiency in the reforming reaction chamber 5, namely, the fuel conversion rate, which is the rate of fuel converted into CO and $H_2$ to the entire fuel in the reforming reaction chamber 5, changes according to an air-fuel ratio of the air-fuel mixture to be supplied to the reforming reaction chamber 5. The optimum catalyst bed temperature T0 for obtaining an appropriate reforming efficiency with regard to practical use can be obtained in advance based on experimental data and the like. If the deviation ΔT between the optimum catalyst bed temperature T0 and the actual catalyst bed temperature (temperature of the reformed gas) is obtained, an air-fuel ratio of the air-fuel mixture in the reforming reaction chamber 5 can be estimated. Accordingly, by ascertaining an amount of shortage or excess of the fuel in the view of realizing an ideal air-fuel ratio in the reforming reaction chamber 5, it is possible to modify the recovery amount correcting map which is used in step S20 in order to correct the recovery amount Gfr of the unvaporized fuel and the like obtained in step S18.

Accordingly, in the fuel reforming device 1, a function β (K, ΔT) of the deviation between the optimum catalyst bed temperature T0 and the reformed gas temperature Tg, and a predetermined coefficient K is set in advance based on experimental data and the like, and stored in the storing device of the ECU 10, in order to modify the correction value Gfg corresponding to the elapsed time tx since the start of reforming, which is read in step S20. After obtaining the deviation ΔT in step S28, the ECU 10 obtains a modification coefficient Kg for modifying the correction value Gfg corresponding to the elapsed time tx in step S30.

After obtaining the modification coefficient Kg in step S30, the ECU 10 calculates a new correction value Gfg corresponding to the elapsed time tx (Gfg=(1+Kg)×Gfg) in step S32. In step S34, the ECU 10 updates the correction value Gfg corresponding to the elapsed time tx in the recovery amount correcting map to the new value obtained in step S32. After performing step S34, the ECU 10 repeatedly performs steps S14 to S34 until determining in step S36 that fuel reforming should be stopped.

As mentioned above, in the fuel reforming device 1 controlled according to the routine shown in FIG. 3, the recovery amount of the unvaporized fuel and the like, that is, the amount of fuel which has been introduced to the mixing chamber 6 but has not flowed in the reforming reaction chamber 5 is obtained in step S18, etc, and the amount of fuel to be introduced to the mixing chamber 6 is corrected (set) in step S22 based on the obtained recovery amount. It is thus possible to accurately set an air-fuel ratio in the reforming reaction chamber 5 to an intended value, and appropriately maintain a reforming efficiency (fuel conversion rate) in the reforming reaction chamber 5 at all times.

In addition, even when the recovery amount correcting map is adapted relatively roughly to each fuel reforming device in the initial state, the recovery amount correcting map is updated (learned) progressively based on the operation state, ambient environment and the like of the fuel reforming device 1, as the operating time of the fuel reforming device 1 becomes longer, by repeatedly performing the control routine shown in FIG. 3. Therefore, with the fuel reforming device 1, it is possible to reduce a cost required to adapt the recovery amount correcting map to each device, and enhance the accuracy of the air-fuel ratio control using the recovery amount correcting map.

Figure 4:
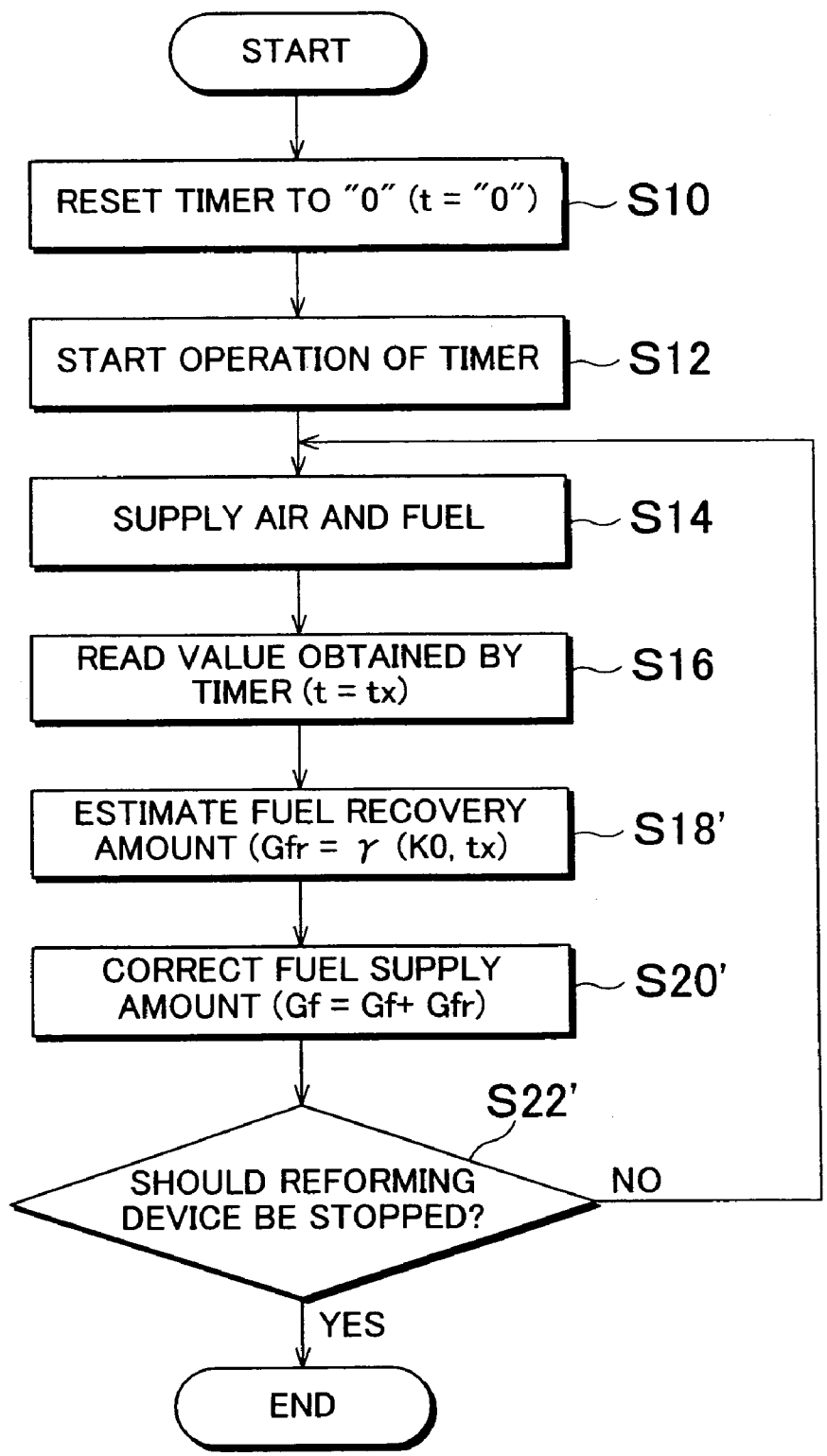
FIG. 4 is a flowchart for describing another control routine applicable to the fuel reforming device shown in FIG. 1 and FIG. 2.

Instead of using the above-mentioned recovery amount correcting map and updating the recovery amount correcting map with time based on the deviation ΔT between the optimum catalyst bed temperature T0 and the reformed gas temperature (catalyst bed temperature) Tg, a map for defining the relationship between the elapsed time tx since the start of reforming and the recovery amount of the unvaporized fuel and the like may be prepared, and this map may be updated with time based on the deviation ΔT. Also, when the function for estimating the fuel recovery amount, which is used in step S18, or the map is accurately adapted to each fuel reforming device in advance, as shown in FIG. 4, it is possible to omit the use of the recovery amount correcting map (step S20) and the map updating process (learning control, steps S26 to S34). Namely, as shown in FIG. 4, the recovery amount Gfr of the unvaporized fuel and the liquid fuel in the mixing chamber 6 is calculated (estimated) in step S18', using a function γ (K0, tx) of the elapsed time tx and a predetermined coefficient K0. Then, a new fuel injection amount Gf is obtained in step S20' by adding the fuel recovery amount Gfr obtained in step S18' to the previously obtained fuel injection amount Gf. After performing step S20', the ECU 10 repeatedly performs steps S14 to S22' until determining in step S22' that fuel reforming should be stopped.

Figure 5:
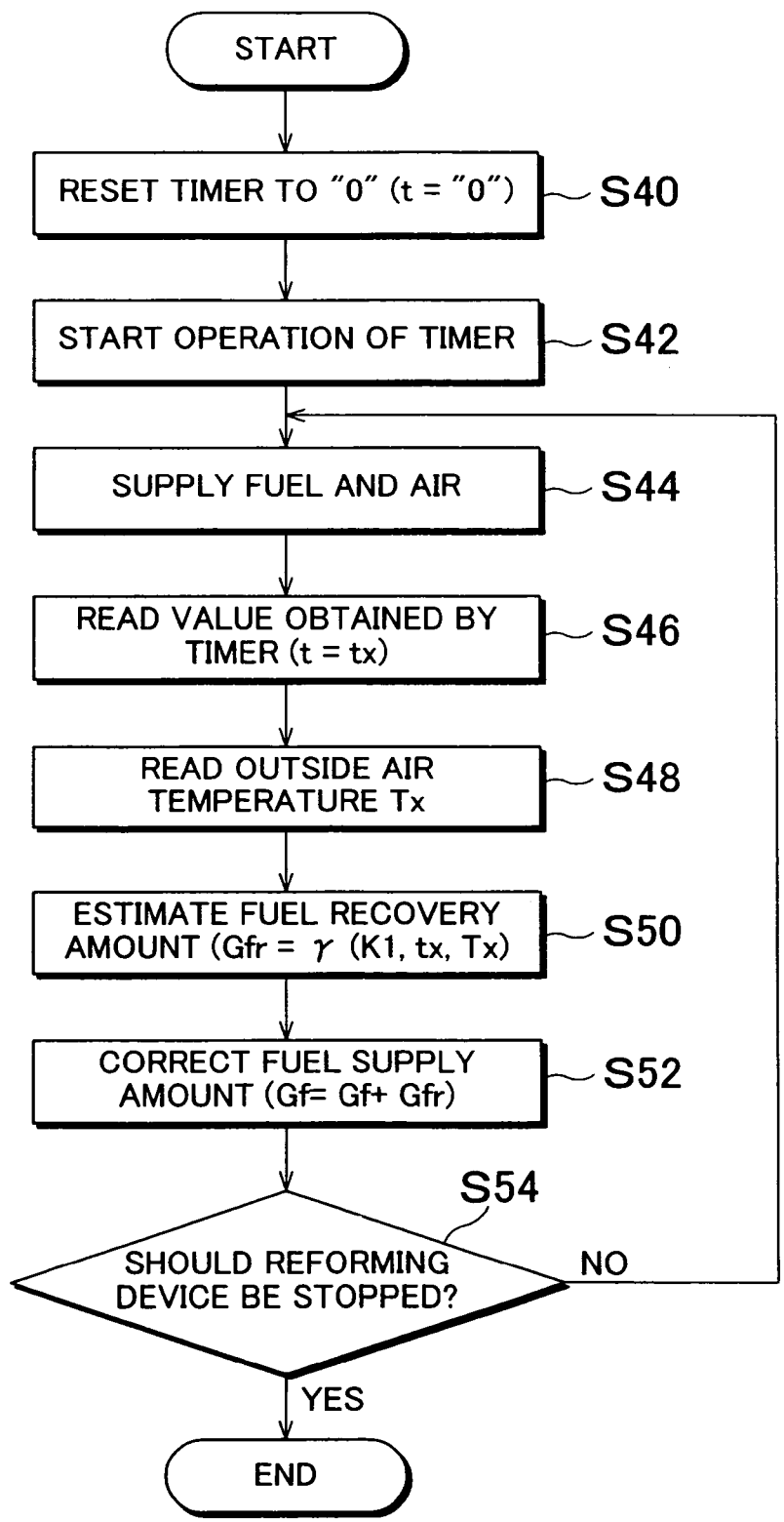
FIG. 5 is a flowchart for describing another control routine applicable to the fuel reforming device shown in FIG. 1 and FIG. 2.

FIG. 5 is a flowchart for describing another control routine applicable to the fuel reforming device 1. In the case where the fuel reforming device 1 is controlled according to the routine shown in FIG. 5, when the fuel reforming device 1 is started, the ECU 10 resets the timer 9 to "0" in step S40 and starts an operation of the timer 9 in step S42. Substantially simultaneously with starting the operation of the timer 9, the ECU 10 sets the fuel injection amount Gf from the fuel injection valve 3 and the air supply amount Ga to the valve housing portion 4 based on the signal from the temperature sensor 8 and according to a predetermined map or the like, and the ECU 10 transmits predetermined control signals to the fuel injection valve 3, the air pump AP and the flow control valve FCV in order to inject fuel from the fuel injection valve 3 and supply air to the valve housing portion 4 in step S44.

After performing step S44, the ECU 10 reads the elapsed time tx since the start of reforming based on the signal from the timer 9 in step S46. Further, the ECU 10 reads an outside air temperature (atmospheric temperature) Tx at this time (when time tx has elapsed since the start of reforming) based on a signal from an outside air temperature sensor (not shown) in step S48. The ECU 10 then calculates (estimates) the recovery amount Gfr of the unvaporized fuel and the like in the mixing chamber 6 using a function σ (K1, tx, Tx) of the elapsed time tx, the outside air temperature Tx, and a predetermined coefficient K1 in step S50. The function σ (K1, tx, Tx) is set in advance based on experimental data and the like, and stored in the storing device of the ECU 10. Note that, in step S50, in order to calculate the fuel recovery amount Gfr, the map for defining the relationship between the elapsed time tx since the start of reforming and the outside air temperature Tx, and the recovery amount of the unvaporized fuel and the like may be used instead of the function σ (K1, tx, Tx).

After calculating the fuel recovery amount Gfr in step S50, the ECU 10 corrects the fuel injection amount Gf from the fuel injection valve 3, using the obtained fuel recovery amount Gfr, in step S52. Namely, the ECU 10 sets a new fuel injection amount Gf (Gf=Gf+Gfr) in step S52. When determining that the fuel reforming should be continued, the ECU 10 performs step S44 again, and transmits a predetermined control signal to at least the flow control valve FCV (also to the fuel injection valve 3 and the air pump AP, if necessary). Thus, the fuel injection amount from the fuel injection valve 3 is corrected (set) based on the recovery amount of the unvaporized fuel and the like.

In the case where the fuel recovery amount in the mixing chamber 6 is calculated (estimated), if the outside air temperature is also taken into consideration, the recovery amount of the unvaporized fuel and the like can be further accurately calculated (estimated). Since the inside temperature (reaction temperature) of the reforming reaction chamber 5 is substantially constant, if the outside air temperature can be obtained, it is possible to accurately estimate parameters such as temperatures of fuel and air when the reforming is started, the inside temperature of the mixing chamber 6 and the temperature of the wall portion of the mixing chamber 6. It is therefore possible to suitably adapt the function and the map to the actual state, the function and the map being used for calculating (estimating) the amount (recovery amount) of the unvaporized fuel and the like, which are easily affected by these parameters.

Figure 6:
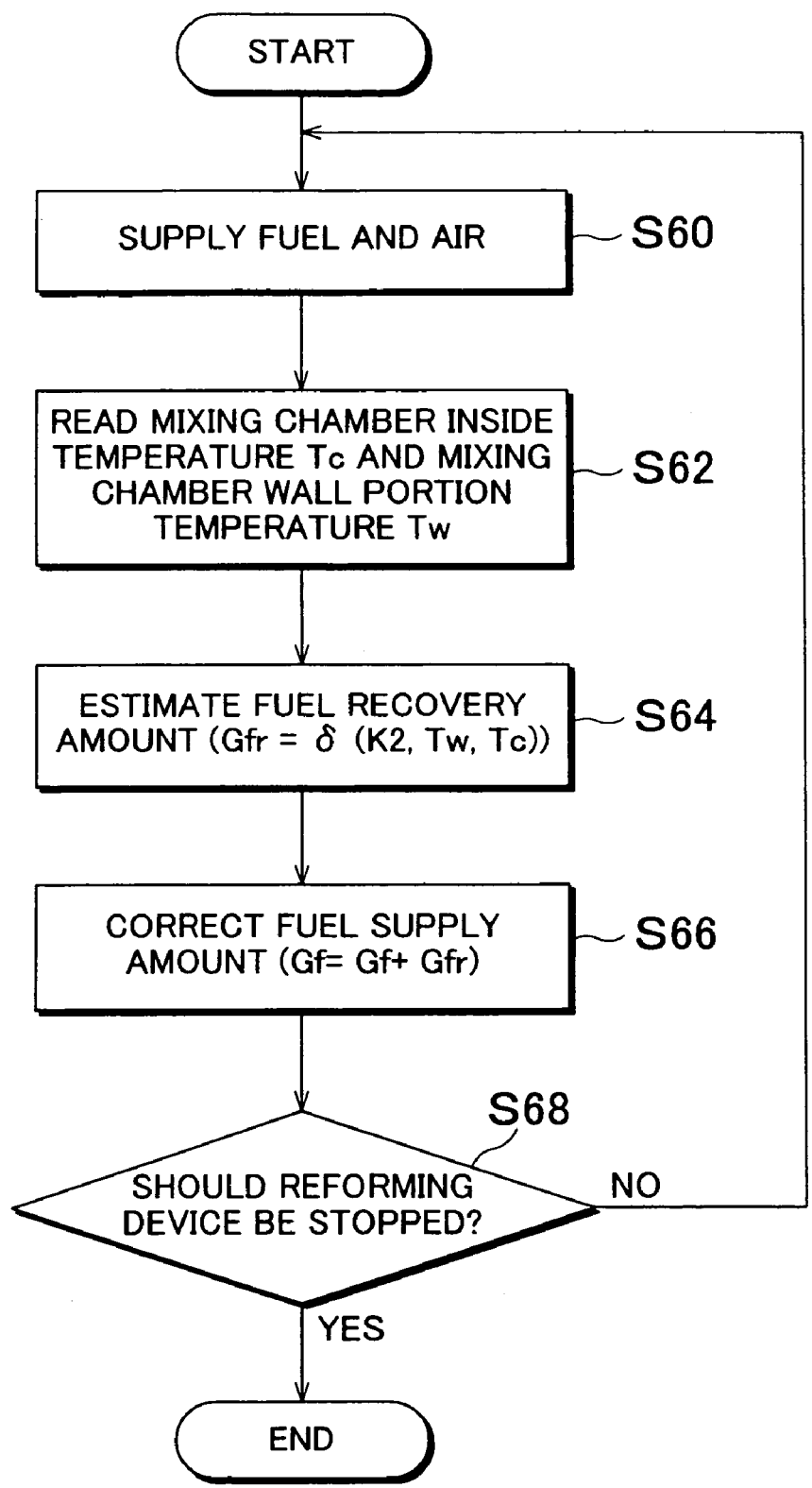
FIG. 6 is a flowchart for describing another control routine applicable to the fuel reforming device shown in FIG. 1 and FIG. 2.

When the fuel recovery amount in the mixing chamber 6 is estimated, as in an example shown in FIG. 6, an inside temperature Tc and a wall portion temperature Tw in the mixing chamber 6 may be detected, and the recovery amount of the unvaporized fuel and the like in the mixing chamber 6 may be calculated (estimated) based on the temperatures Tw and Tc. It is thus possible to calculate (estimate) the recovery amount of the unvaporized fuel and the like with considerably high accuracy. In this case, when starting fuel injection from the fuel injection valve 3 and air supply by the air pump AP and the like in order to start fuel reforming in step S60, the ECU 10 obtains the inside temperature Tc and the wall portion temperature Tw in the mixing chamber 6 in step S62 based on signals from a temperature sensor 50 which detects the inside temperature Tc of the mixing chamber 6 and a temperature sensor 60 which detects the wall portion (main body 2) temperature Tw of the mixing chamber 6.

After performing step S62, the ECU 10 calculates (estimates) the recovery amount Gfr of the unvaporized fuel and the like in the mixing chamber 6 in step S64, using a function δ (K2, Tw, Tc) of the inside temperature Tc of the mixing chamber 6, the wall portion temperature Tw of the mixing chamber 6, and a predetermined coefficient K2. The function δ (K2, Tw, Tc) is set in advance based on experimental data and the like, and stored in the storing device of the ECU 10. Note that, in step S64, in order to calculate the fuel recovery amount Gfr, the map for defining the relationship among the inside temperature Tc of the mixing chamber 6, the wall temperature Tw, and the recovery amount of the unvaporized fuel and the like may be used in stead of the function δ (K2, Tw, Tc).

After calculating the fuel recovery amount Gfr in step S64, the ECU 10 corrects the fuel injection amount Gf from the fuel injection valve 3 in step S66, using the obtained fuel recovery amount Gfr. Namely, when setting a new fuel injection amount Gf (Gf=Gf+Gfr) in step S66, and determining in step S68 that fuel reforming should be continued, the ECU 10 performs step S60 again, and transmits a predetermined control signal to at least the flow control valve FCV (also to the fuel injection valve 3 and the air pump AP, if necessary). Thus, the fuel injection amount from the fuel injection valve 3 is corrected (set) based on the recovery amount of the unvaporized fuel and the like.

In the examples shown in FIG. 5 and FIG. 6, as well as in the example shown in FIG. 3, it is possible to use the recovery amount correcting map and perform a map updating process. In the examples shown in FIG. 5 and FIG. 6, a map for directly obtaining the recovery amount of the unvaporized fuel and the like may be prepared, and this map may be updated with time.

Hereafter, a fuel reforming device according to a second embodiment of the invention will be described in detail with reference to FIG. 7. Note that the same reference numerals will be assigned to the same elements as those in the description concerning the first embodiment, and overlapping descriptions will not be made.

Figure 7:
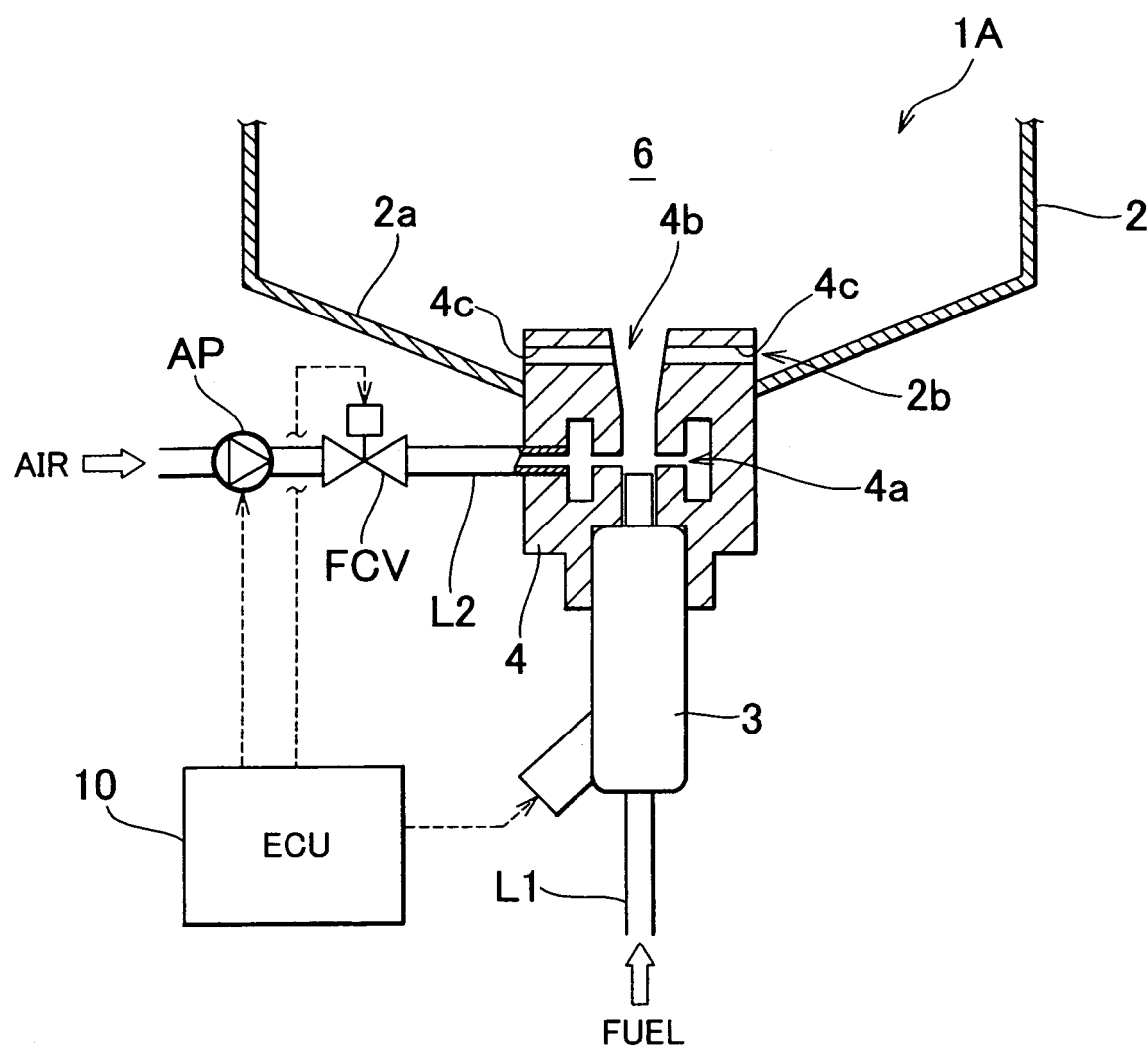
FIG. 7 is a sectional view showing an enlarged main portion of a fuel reforming device according to a second embodiment of the invention.

In a fuel reforming device 1A shown in FIG. 7, an amount of protrusion of the valve housing portion 4 to the inside of the main body 2 is large, compared with the fuel reforming device 1 shown in FIG. 1 and FIG. 2. A fuel reservoir portion 2b, which reserves the unvaporized fuel and the like recovered by the inclined surface 2a, is formed by the outer surface of the valve housing portion 4 and the inclined surface 2a of the main body 2. In the valve housing portion 4, there is arranged at least one communication passage 4c, which permits communication between the fuel reservoir portion 2b formed around the outer surface of the valve housing portion 4 and the air-fuel mixture spray hole 4b, (in the embodiment, plural communication passages 4c are arranged in a radial pattern).

In the thus composed fuel reforming device 1A, the mixture formed of the fuel injected from the fuel injection valve 3 and the air pumped by the air pump AP is sprayed from the air-fuel mixture spray hole 4b. Accordingly, the flow rate of the air-fuel mixture in the air-fuel mixture spray hole 4b is higher than the flow rate of the unvaporized fuel and the like in the fuel reservoir portion 2b. Therefore, the pressure in the air-fuel mixture spray hole 4b is lower than the pressure in the fuel reservoir portion 2b. Due to this pressure difference, the fuel in the fuel reservoir portion 2b is sucked to the air-fuel mixture spray hole 4b of the valve housing portion 4, and is mixed with the air-fuel mixture in the air-fuel mixture spray hole 4b.

As mentioned above, as means for re-supplying the fuel recovered in the mixing chamber 6 to the mixing chamber 6, the communication passage 4c may be arranged in the valve housing portion 4, the communication passage 4c permitting communication between the fuel reservoir portion 2b that is formed by the outer surface of the valve housing portion 4 and the inclined surface 2a of the main body 2, and the air-fuel mixture spray hole 4b. It is thus possible to reliably re-supply the fuel recovered in the mixing chamber 6 to the mixing chamber 6. When such a configuration is employed, means requiring power such as a fuel recovery pump need not be used. It is therefore possible to reduce the size of the entire reforming device, reduce the costs, and improve the reliability thereof.

Figure 8:
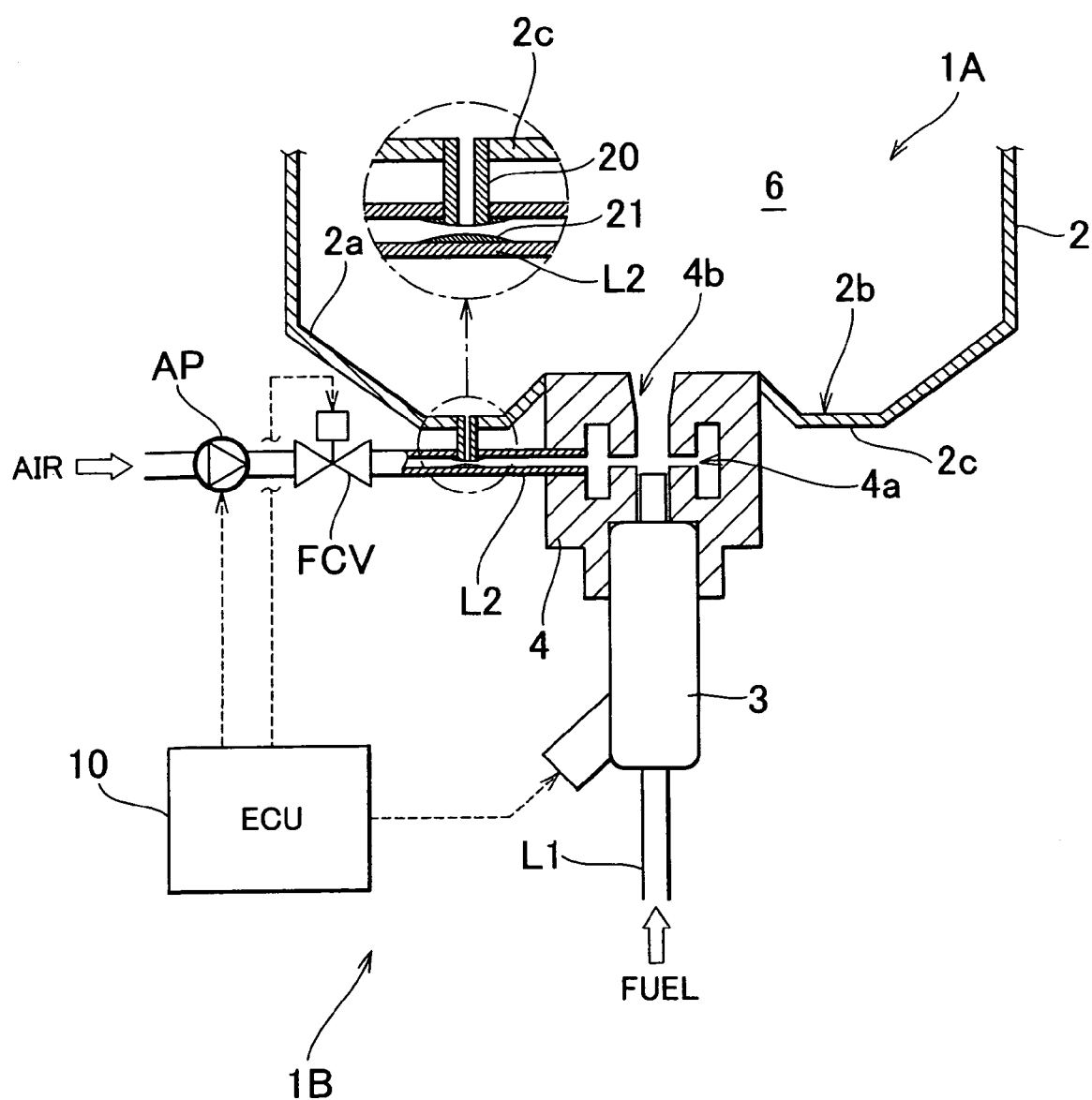
FIG. 8 is a sectional view showing an enlarged main portion of a fuel reforming device according to a third embodiment of the invention.

Hereafter, a fuel reforming device according to a third embodiment of the invention will be described in detail with reference to FIG. 8. Note that the same reference numerals will be assigned to the same elements as those in the description concerning the first embodiment, and overlapping descriptions will not be made.

In a fuel reforming device 1B shown in FIG. 8, by arranging a bottom portion 2c of the main body 2 contiguous to the inner periphery of the inclined surface 2a at a position below the upper surface of the valve housing portion 4, the fuel reservoir portion 2b is formed around the valve housing portion 4. One end of the communication pipe 20 is connected to the bottom portion 2c of the main body 2, and the other end of the communication pipe 20 is connected to the supply pipe L2 at a portion between the flow control valve FCV and the air passage 4a. As a result, the fuel reservoir portion 2b in the mixing chamber 6 and the inside of the supply pipe L2 are communicated to each other via the communication pipe 20. Also, a venturi pipe (low pressure forming means) 21 is arranged inside the supply pipe L2. The venturi pipe 21 is arranged as a pipe-like member having a smallest diameter portion, where the internal diameter of the venturi pipe 21 is the smallest, at the center portion in the longitudinal direction. The other end of the communication pipe 20 is connected to the venturi pipe 21 in the supply pipe L2 at the center portion 21 in the longitudinal direction, that is, the smallest diameter portion of the venturi pip 21.

In the thus composed fuel reforming device 1B, the air pumped by the air pump AP flows in the venturi pipe 21 in the supply pipe L2. The flow rate of the air becomes the highest near the smallest diameter portion, where the internal diameter of the venturi pipe 21 is the smallest, that is, near a joint portion where the supply pipe L2 is connected to the communication pipe 20. Thus, the internal pressure of the supply pipe L2 near the joint portion becomes lower than the pressure in the fuel reservoir portion 2b. Due to this pressure difference, the fuel in the fuel reservoir portion 2b is sucked to the inside of the supply pipe L2, and is mixed with air in the supply pipe L2.

As mentioned above, as means for re-supplying the fuel recovered in the mixing chamber 6 to the mixing chamber 6, the communication pipe 20 which permits communication between the fuel reservoir portion 2b formed around the outer surface of the valve housing portion 4 and the supply pipe L2, and the venturi pipe 21 which makes the pressure inside the supply pipe L2 lower than the pressure in the fuel reservoir portion 2b may be used. It is thus possible to reliably re-supply the fuel recovered in the mixing chamber 6 to the mixing chamber 6. When such a configuration is employed, means requiring power such as a fuel recovery pump need not be used. It is therefore possible to reduce the size of the entire reforming device, reduce the costs, and improve the reliability thereof.

Hereafter, a fuel reforming device according to a fourth embodiment of the invention will be described in detail with reference to FIG. 9. Note that the same reference numerals will be assigned to the same elements as those in the description concerning the first embodiment, and overlapping descriptions will not be made.

Figure 9:
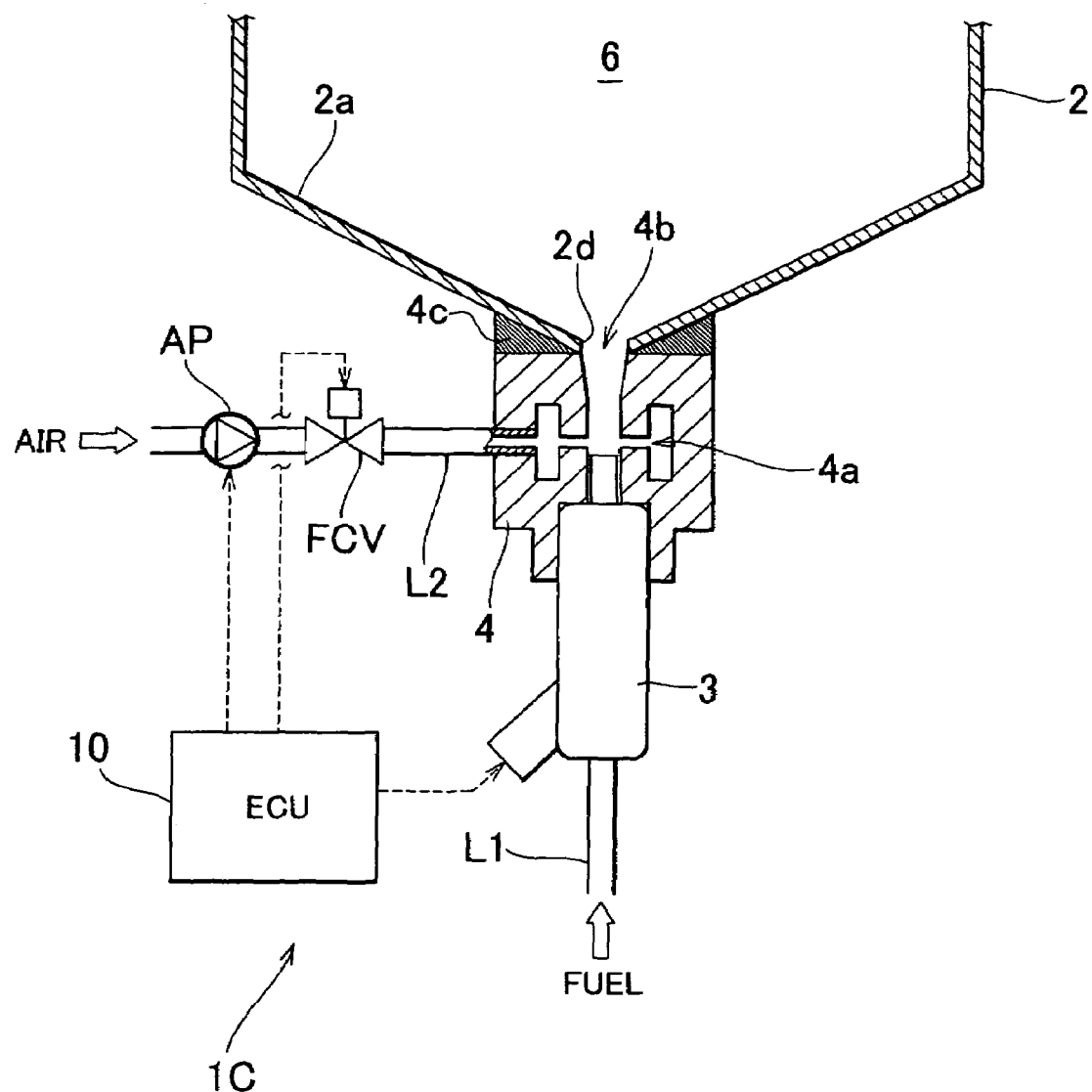
FIG. 9 is a sectional view showing an enlarged main portion of a fuel reforming device according to a fourth embodiment of the invention.

In a fuel reforming device 1C shown in FIG. 9, the inclined surface 2a, which inclines downward toward the valve housing portion 4 (the fuel injection valve 3), is formed at the lower end of the main body 2. In the embodiment, the lower end portion of the main body 2 including the incline surface 2a is formed in a choanoid shape, and an opening 2d of the lower end portion is directly connected to the air-fuel mixture spray hole 4b of the valve housing portion 4. Thus, the unvaporized fuel and the liquid fuel which drop on the inclined surface 2a are introduced from the opening 2d to the air-fuel mixture spray hole 4b along the inclined surface 2a, and are mixed with the air-fuel mixture in the air-fuel mixture spray hole 4b.

Even when the unvaporized fuel and the like recovered in the mixing chamber 6 are directly introduced to the air-fuel mixture spray hole 4b using the incline surface 2a of the main body 2 and mixed with the air-fuel mixture, the fuel recovered in the mixing chamber 6 can be reliably re-supplied to the mixing chamber 6. When such a configuration is employed, means requiring power such as a fuel recovery pump need not be used. It is therefore possible to reduce the size of the entire reforming device, reduce the costs, and improve the reliability thereof.

Hereafter, a fuel reforming device according to a fifth embodiment of the invention will be described in detail with reference to FIG. 10. Note that the same reference numerals will be assigned to the same elements as those in the description concerning the first embodiment, and overlapping descriptions will not be made.

Figure 10:
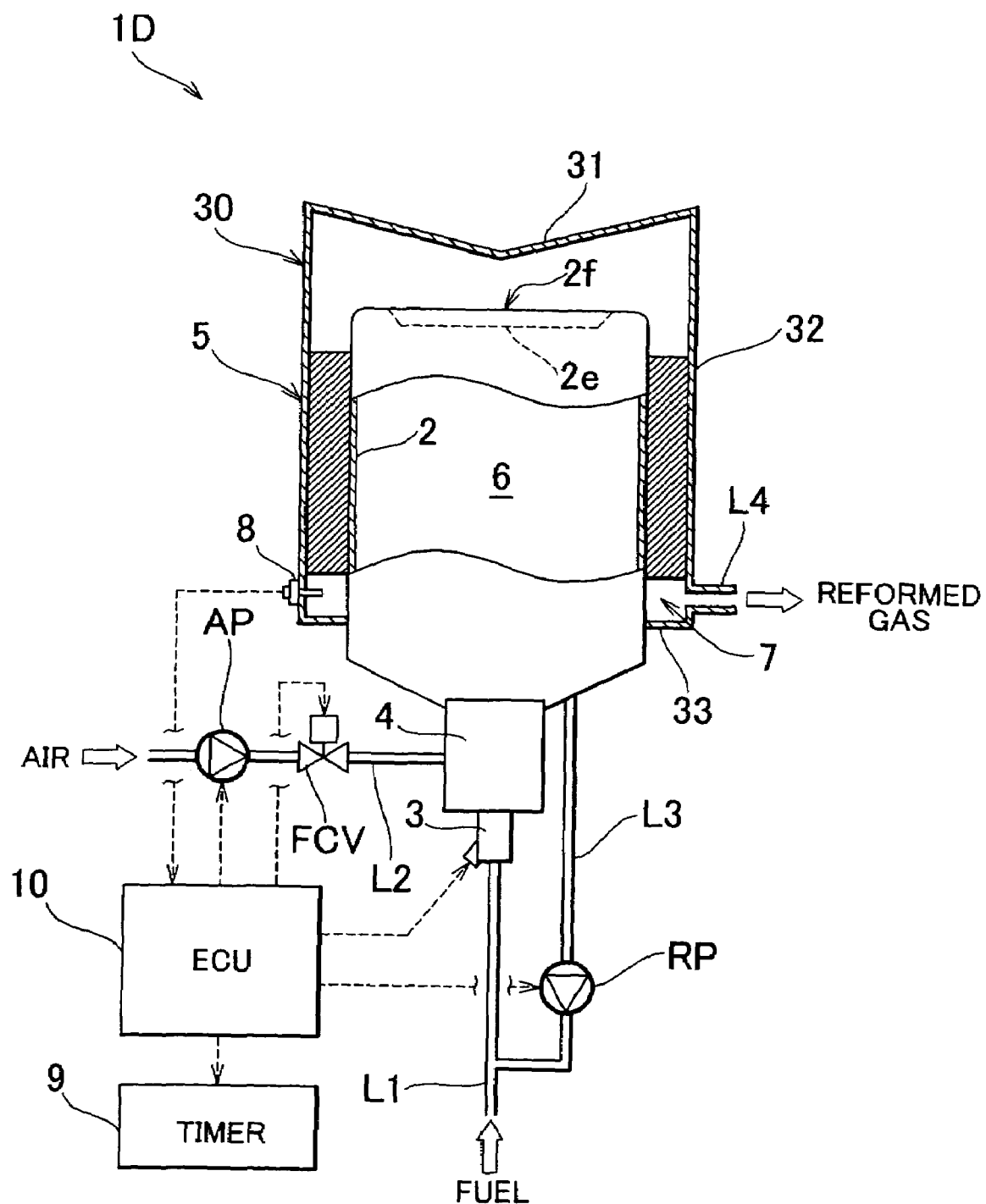
FIG. 10 is a view schematically showing a fuel reforming device according to a fifth embodiment of the invention.

In a fuel reforming device 1D shown in FIG. 10, the overall height of the main body 2 is less than that in the above-mentioned embodiments, and the upper end of the main body 2 is open. Also, the reforming reaction chamber 5 is not arranged inside the main body 2, and the inside of the main body 2 is used only as the mixing chamber 6. In addition, the fuel reforming device 1D includes an external cylinder member 30 which concentrically surrounds the outer surface of the main body 2 with a predetermined distance therebetween. As shown in FIG. 10, the upper end and the lower end of the external cylinder member 30 are fully closed, and a space communicated to the mixing chamber 6 is arranged between the main body 2 and the external cylinder member 30. A roof portion 31 of the external cylinder member 30 is formed such that a center portion of the roof portion 31 protrudes downward toward the main body 2. Thus, a roof surface of the external cylinder member 30 is inclined downward from the outside to the center.

In a ring shaped space portion formed between the outer surface of the main body 2 and an outer peripheral portion 32 of the external cylinder member 30, the reforming reaction chamber 5 is formed by providing a honeycomb body supporting a predetermined reforming catalyst. Namely, in the fuel reforming device 1D according to the embodiment, the reforming reaction chamber 5 is arranged around the outer surface of the mixing chamber 6. In addition, below the reforming reaction chamber 5, the reformed gas supply chamber 7 is formed by the outer peripheral portion 32, a bottom portion 33 of the external cylinder member 30, and the main body 2. A reformed gas supply pipe L4 is connected to the external cylinder member 30 so as to permit communication to the reformed gas supply chamber 7.

In the fuel reforming device 1D including the reforming reaction chamber 5 formed around the outer surface of the mixing chamber 6, the temperature of the wall portion (main body 2) of the mixing chamber 6 and the temperature inside the mixing chamber 6 can be increased using heat generated in the reforming reaction chamber 5 due to fuel reforming. Accordingly, with such a configuration, vaporization of the unvaporized fuel and the liquid fuel adhering to the inner surface of the wall portion (main body 2) of the mixing chamber 6 can be efficiently promoted, and mixing of fuel and air in the mixing chamber 6 can be considerably suitably promoted. As a result, the air-fuel ratio of the air-fuel mixture in the reforming reaction chamber 5 can be accurately maintained at an intended value. It is therefore possible to appropriately maintain the reforming efficiency (fuel conversion rate) in the reforming reaction chamber 5 at all times.

Also, in the fuel reforming device 1D, the roof surface of the external cylinder member 30 is inclined downward from the outside to the center. Accordingly, even if the unvaporized fuel and the like adhere to the roof surface of the external cylinder member 30, the fuel and the like flow downward along the roof surface of the external cylinder member 30, and are introduced to the mixing chamber 6. Therefore with fuel reforming device 1D, it is possible to easily and reliably inhibit, using gravity, particles of fuel which has not been sufficiently vaporized (i.e., atomized), each of the particles still having a relatively heavy weight, and liquid fuel, which is condensed on a wall surface of the mixing chamber 6, from flowing into the reforming reaction chamber 5 on the downstream side.

Further, in the embodiment, a center portion $2f$ of the upper portion of the main body 2 is open, and an upper edge portion $2e$ of the main body 2 is folded inward and downward, as shown in FIG. 10. Accordingly, the unvaporized fuel and the like which flow upward from the mixing chamber 6 are made to hit the upper edge portion $2e$ and return to the mixing chamber 6. It is possible to reliably inhibit the unvaporized fuel and the like from flowing into the reforming reaction chamber 5 on the downstream side. Also, by folding the upper edge portion $2e$ of the main body 2 inward and downward, the overall height of the main body 2 can be reduced, and therefore, the size of the entire device can be reduced. The reforming reaction chamber 5 may be formed around the outer surface of the mixing chamber 6 in any one of the fuel reforming devices 1, 1A, 1B and 1C according to the above-mentioned embodiments.

What is claimed is:

1. A fuel reforming device for reforming a mixture of fuel and air comprising:
   a mixing chamber to which fuel and air are introduced and which is composed such that a mixture of the fuel and the air flows upward;
   a reforming reaction chamber which is arranged downstream of the mixing chamber and which includes a reforming catalyst that reforms the mixture; and
   a fuel recovering portion which is arranged in a lower portion of the mixing chamber and which recovers the fuel that has not reached an inside of the reforming reaction chamber.

2. The fuel reforming device according to claim 1, further comprising:
   a fuel injection valve which is connected to the lower portion of the mixing chamber and which injects the fuel upward, wherein the fuel recovering portion includes an inclined surface arranged around the fuel injection valve, and the inclined surface inclines downward toward the fuel injection valve.

3. The fuel reforming device according to claim 2, wherein the fuel recovering portion includes a fuel reservoir portion which reserves the recovered fuel, and the inclined surface forms a part of the fuel reservoir portion.

4. The fuel reforming device according to claim 1, further comprising:
   an introducing portion which re-introduces the recovered fuel to the mixing chamber.

5. The fuel reforming device according to claim 4, wherein the fuel recovering portion includes a fuel reservoir portion which reserves the recovered fuel, and the introducing portion re-introduces the reserved fuel to the mixing chamber.

6. The fuel reforming device according to claim 5, further comprising:
   a fuel injection valve which is connected to the lower portion of the mixing chamber and which injects the fuel upward; and
   a spray portion that includes a spray hole from which the mixture formed by introducing the air to the injected fuel is sprayed, wherein the introducing portion includes a passage which permits communication between the spray hole and the fuel reservoir portion.

7. The fuel reforming device according to claim 5, further comprising:
   a spray portion that includes a spray hole from which the mixture formed by introducing the air to the injected fuel is sprayed; and
   a first passage which introduces the air to the spray hole; wherein the introducing portion includes a second passage which permits communication between the fuel reservoir portion and the first passage.

8. The fuel reforming device according to claim 4, further comprising:
   a fuel injection valve which is connected to the lower portion of the mixing chamber and which injects the fuel upward; and
   a fuel supply passage which supplies the fuel to the fuel injection valve, wherein the introducing portion includes a fuel recovery passage which is connected to the fuel supply passage and the lower portion of the mixing chamber; and a pump which is provided in the fuel recovery passage and which pumps the recovered fuel to the fuel supply passage.

9. The fuel reforming device according to claim 1, wherein the reforming reaction chamber is provided around an outer surface of the mixing chamber.

10. The fuel reforming device according to claim 9, further comprising:
    a housing portion which houses the mixing chamber and the reforming reaction chamber, wherein the housing portion includes a roof portion which is positioned above the mixing chamber and the reforming reaction chamber, and the roof portion is inclined downward toward a center of the roof portion.

11. The fuel reforming device according to claim 1, wherein the mixing chamber is provided below the reforming reaction chamber.

12. The fuel reforming device according to claim 1, further comprising:
    an obtaining portion which obtains an amount of the recovered fuel; and
    a controller which sets an amount of the fuel to be introduced to the mixing chamber based on the amount of the recovered fuel obtained by the obtaining portion.

13. The fuel reforming device according to claim 12, further comprising:
    a fuel injection valve which is connected to the lower portion of the mixing chamber and which injects the fuel upward, wherein the controller controls the fuel injection valve such that the fuel injection valve injects the set amount of the fuel.

14. The fuel reforming device according to claim 12, further comprising:
a timer which measures time that has elapsed since introduction of the fuel and the air to the mixing chamber is started, wherein the obtaining portion estimates the amount of the recovered fuel based on the time obtained by the measurement, in order to obtain the amount of the recovered fuel.

15. The fuel reforming device according to claim 12, further comprising:
a detector which detects a catalyst temperature of the reforming catalyst, wherein the obtaining portion estimates the amount of the recovered fuel based on the detected catalyst temperature, in order to obtain the amount of the recovered fuel.

16. The fuel reforming device according to claim 15, wherein
the detector detects a gas temperature of reformed gas at a position downstream of the reforming catalyst, as the catalyst temperature, and
the obtaining portion estimates the amount of the recovered fuel based on the detected gas temperature, in order to obtain the amount of the recovered fuel.

17. A fuel reforming method for reforming a mixture of fuel and air, wherein fuel and air are introduced to a mixing chamber, and a mixture of the fuel and the air is made to flow upward in the mixing chamber and flows into a reforming reaction chamber arranged downstream of the mixing chamber, and the fuel which has not reached an inside of the reforming reaction chamber is recovered at a lower portion of the mixing chamber.

18. A fuel reforming device for reforming a mixture of fuel and air, comprising:
a mixing chamber to which fuel and air are introduced and which is composed such that a mixture of the fuel and the air flows upward;
a reforming reaction chamber which is arranged downstream of the mixing chamber and which includes a reforming catalyst that reforms the mixture; and
fuel recovering means for recovering the fuel that has not reached an inside of the reforming reaction chamber, which is arranged in a lower portion of the mixing chamber.

19. The fuel reforming device according to claim 18, further comprising:
introducing means for re-introducing the recovered fuel to the mixing chamber.

20. The fuel reforming device according to claim 19, further comprising:
fuel recovery amount obtaining means for obtaining an amount of the recovered fuel; and
setting means for setting an amount of the fuel to be introduced to the mixing chamber based on the amount of the recovered fuel, which is obtained by the fuel recovery amount obtaining means.

* * * * *